(12) United States Patent
Spitz et al.

(10) Patent No.: US 8,625,797 B2
(45) Date of Patent: Jan. 7, 2014

(54) RELEASING A SERVICE ON AN ELECTRONIC APPLIANCE

(75) Inventors: Stephan Spitz, München (DE); Helmut Scherzer, Tübingen (DE); Thorsten Urhahn, Ulm (DE); Hans Borgs, Feldkirchen-Westerham (DE)

(73) Assignee: Giesecke & Devrient GmbH, Munich (DE)

( * ) Notice: Subject to any disclaimer, the term of this patent is extended or adjusted under 35 U.S.C. 154(b) by 274 days.

(21) Appl. No.: 12/997,693

(22) PCT Filed: Jun. 22, 2009

(86) PCT No.: PCT/EP2009/004482
§ 371 (c)(1),
(2), (4) Date: Dec. 13, 2010

(87) PCT Pub. No.: WO2009/156108
PCT Pub. Date: Dec. 30, 2009

(65) Prior Publication Data
US 2011/0091039 A1    Apr. 21, 2011

(30) Foreign Application Priority Data
Jun. 23, 2008 (DE) .......................... 10 2008 029 636

(51) Int. Cl.
*H04L 9/30* (2006.01)
*G06F 15/16* (2006.01)
*G06F 15/177* (2006.01)

(52) U.S. Cl.
USPC ............... 380/260; 380/277; 713/2; 713/173; 713/187

(58) Field of Classification Search
USPC ........................................................ 380/260
See application file for complete search history.

(56) References Cited

U.S. PATENT DOCUMENTS 5,454,000 A * 9/1995 Dorfman .......................... 714/54
5,757,919 A * 5/1998 Herbert et al. ................ 713/187
(Continued)

FOREIGN PATENT DOCUMENTS

CN    1905448 A    1/2007
WO    9938070 A1   7/1999
(Continued)

OTHER PUBLICATIONS

Paul England, Ed.; Peter Lipp et al.: Practical Techniques for Operating System Attestation, Mar. 11, 2008, Trusted Computing—Challenges and Applications (LNCS); Springer, Berlin, Heidelberg; pp. 1-13. ISBN: 978-3-540-68972-2; p. 9, paragraph 4.2, to p. 11, line 10.

(Continued)

*Primary Examiner* — Kambiz Zand
*Assistant Examiner* — Yonas Bayou
(74) *Attorney, Agent, or Firm* — Bacon & Thomas, PLLC

(57) ABSTRACT

There is proposed a method for enabling a service made available by an electronic device (100), wherein a registration request (114) is generated (S3) by the device (100) and sent (S7) to the registration server (300). The registration server (300) thereupon generates (S8) a registration confirmation (305) and sends (S9) it to the device (100), where the service is finally enabled by receiving and saving (S10) of the registration confirmation (305) on the device (100). In this connection, a trustworthy authority (200) sets up (S6, S12) a timeframe on the registration server (300) such that the registration server (300) sends (S9) a registration confirmation (305) only for a registration request (114) received within the timeframe, and the device (100) sends (S7) the registration request (114) to the registration server (300) within the timeframe.

15 Claims, 3 Drawing Sheets

(56) References Cited

U.S. PATENT DOCUMENTS

| | | | |
|---|---|---|---|
| 5,940,007 A * | 8/1999 | Brinkmeyer et al. | 340/12.29 |
| 6,560,706 B1 * | 5/2003 | Carbajal et al. | 713/155 |
| 8,201,240 B2 * | 6/2012 | Tarkkala | 726/18 |
| 8,244,845 B2 * | 8/2012 | Rao | 709/223 |
| 2004/0193873 A1 * | 9/2004 | England | 713/156 |
| 2005/0010757 A1 * | 1/2005 | Bosler | 713/156 |
| 2005/0097328 A1 * | 5/2005 | England | 713/173 |
| 2006/0111105 A1 | 5/2006 | Bajar et al. | |
| 2007/0250632 A1 * | 10/2007 | Nomura et al. | 709/227 |
| 2008/0170697 A1 * | 7/2008 | Heinonen et al. | 380/277 |
| 2009/0070596 A1 * | 3/2009 | Mantin et al. | 713/189 |
| 2009/0198997 A1 * | 8/2009 | Yeap et al. | 713/155 |

FOREIGN PATENT DOCUMENTS

| | | |
|---|---|---|
| WO | 0142889 A2 | 6/2001 |
| WO | 2007054942 A2 | 5/2007 |
| WO | 2008049959 A2 | 5/2008 |

OTHER PUBLICATIONS

International Search Report in PCT/EP2009/004482, Apr. 12, 2011.
Search Report of German PTO regarding German Patent Application 10 2008 029 636.8, Jan. 20, 2009.

* cited by examiner

RELEASING A SERVICE ON AN ELECTRONIC APPLIANCE

FIELD OF THE INVENTION

The present invention relates to a method for enabling a service made available by an electronic device, to such an electronic device and to a system comprising such an electronic device.

BACKGROUND

For portable data carriers and mobile electronic devices there are diverse security mechanisms known which are intended to ensure the integrity of the device and of the data saved thereon, or the unique identification of the data carrier or of its owner.

The technical basis for such mechanisms that protect integrity or make identification possible is often a specially secured storage area for saving e.g. identification data tamper-resistantly therein. There exist for example special insulating mechanisms by which hardware areas and/or accesses to software components of a terminal for security-critical data and processes can be set up and effectively sealed off from accordingly unsecured areas, e.g. by software solutions, such as secure virtual processors, or hardware solutions, such as dedicated security kernels. Within such a secured area, in particular security-critical processes can be executed, e.g. in by a secure runtime environment by means of a suitable interpreter.

For reasons of security and practicality, data relating to an individualization or identification of portable data carriers are usually saved during the production process, or at least before the issue of the relevant data carrier to a user, in the data carrier, e.g. in a secured area of a chip card, smart card or the like. A corresponding individualization of arbitrary mobile terminals within the framework of a production process involves considerable costs, however, on account of the infrastructure necessary therefor and a lower throughput resulting therefrom.

In principle, cryptographic methods are available for individualization of mobile terminals, for example based on a symmetric key pair present on the terminal to be individualized, the public key of said key pair being provided with an electronic certificate by a trustworthy certification authority. Through a certification, communication partners of the relevant device who are employing its public key for encryption or for checking a signature of the device can make sure that the public key actually comes from the relevant device and has not been planted for fraudulent purposes.

In this connection, WO 2008/049959 A2 proposes a certification method according to the PKCS specification ("Public Key Cryptography Standard") in a mobile radio communication environment with possibly limited transfer rate and network security. US 2005/0010757 discloses a certification method on a distributed network wherein a certification request from a network node to a certification server is for security reasons only possible within a predefined time interval from the initialization of the corresponding network node, which in connection with mobile terminals would again require a basically impracticable individualization at a time close to their usual initialization within the framework of production. The receipt of a certificate request from a network node within the permissible time interval is monitored on the basis of the network node initialization time available to the certification server and of the time interval duration.

SUMMARY

It is the object of the present invention to provide a secure, practicable and cost-efficient way of individualizing electronic, mobile terminals.

On an electronic device, a service that is made available but not yet enabled for utilization—e.g. execution by a user of the device—is enabled by a registration procedure vis-à-vis a registration server. Such a service to be enabled can be in principle any arbitrary expansion of functions or resources of the electronic device, in particular the enabling of an individualized operation on a device that is at first not individualized, or of a secured, insulated area for making available further security functionalities of the terminal.

In the following, "registration" will be understood to mean the data communication between the electronic device and the registration server, while as the result of registration the actual making available of the relevant service on the device for use by the user will be designated as "enabling". Thus, within the framework of a registration procedure the electronic device generates a registration request and sends it to the registration server, which generates a registration confirmation in response to the received registration request, and sends it back to the device. Finally, the relevant service is enabled on the device by the received registration confirmation being saved on the device in an intended fashion.

According to the invention, a trustworthy third authority sets up a timeframe for the above-outlined registration procedure such that solely a registration request received within said timeframe is processed by the registration server and can lead to a registration of the relevant service vis-à-vis the registration server. The relevant service can thus only be enabled when the registration request is sent to the registration server within the set-up timeframe; a registration request arriving at the registration server outside said timeframe (or even before the set-up of the timeframe) is at least not answered with a registration confirmation by the registration server. In this connection, the timeframe can be set up by the trustworthy authority in principle with an arbitrary starting and ending time, e.g. also in periodically iterative fashion or the like.

Thus, the registration and enabling of a service can be carried out with sufficient security by the device itself within an almost arbitrary timeframe. This is an advantage in particular for those services that could only be enabled within the framework of the production process with considerable resource consumption, e.g. within the framework of time-consuming initialization processes of certain services, or that require an individualization of the electronic device in an environment that is in principle more insecure than the production environment, which is secured to the greatest possible extent. Further, the registration and enabling can be set up in flexible fashion, e.g. in dependence on specifications or modes of behavior of the user of an electronic device or on the service to be enabled itself, e.g. by the timeframe being coordinated with an installation procedure or initialization procedure of the service on the device.

An electronic device according to the invention therefore comprises at least sufficient resources for making available services, e.g. in the form of software applications, in particular a processor and one or several memories. Furthermore, an electronic device comprises a data communication interface which makes possible the data communication with the registration server to be carried out within the framework of the registration procedure, and a registration unit which controls the registration procedure and the final enabling of a service by saving a received registration confirmation. The registration unit is set up according to the invention such that the registration request is sent to the registration server within the timeframe set up on the registration server by the trustworthy authority, i.e. the registration unit possesses or receives the sufficient information about the timeframe and coordinates the registration procedure therewith.

The registration unit can ensure a timely registration request to the registration server by e.g. a registration request being sent automatically within a timeframe already configured on the registration unit upon the production, set-up or initialization of the device, or by the registration request being sent in reaction to information determining the timeframe from the trustworthy authority or the registration server.

A registration system according to the invention therefore comprises an electronic device, a registration server and a trustworthy authority which are in each case set up and cooperate such that a service made available by the electronic device can be enabled according to the above-described registration procedure.

In this connection, the registration server is preferably a central server equipped with a special trustworthiness, which has been set up, and authorized to perform the registration of services, e.g. by a manufacturer of the electronic device or a similarly trustworthy authority.

The trustworthy authority can be for example a communication apparatus of a middleman that sells electronic devices according to the invention or services to be installed and enabled on such devices, or a credit institution, a government agency or another such authority. The trustworthiness of said authority or of the corresponding communication apparatus is established by an authentication to the registration server, for example cryptographically or by means of a password. This causes the trustworthiness of the registration server to be extended to the authority, which is thus entitled to set up a timeframe on the registration server.

The trustworthy authority can either inform the registration server of a future timeframe by corresponding time signals, or actively start the timeframe on the registration server by a start signal. In the latter case the registration server can close the timeframe upon receipt of a stop signal or upon expiry of a predefined time duration. In particular, the trustworthy authority can set up a timeframe with an arbitrary starting time after the production of the electronic device, e.g. after the issue of the electronic device to a user (e.g. by the trustworthy authority) or the installation of a service to be enabled on the electronic device.

The registration request generated by the registration unit preferably comprises a unique identification of the particular service to be enabled, so that there is in particular the possibility that the registration server can log and bill for the enabling of said service and thus its time of use by a user. In particular insofar as the service to be enabled is not a dedicated software application or the like, but rather a basic function expansion of the electronic device, there can also be integrated into the registration request a unique identification of the electronic device, instead of a unique identification of the service to be enabled (or additionally thereto). The unique device information can be the serial number of the device. Said unique service information or device information can also be used by the registration server to recognize, and to block, a new enabling attempt by means of a new registration request on the basis of the service identification or device identification available to the registration server. It is of course also possible that an enabling is only effective for a predefined time period, and a new registration/enabling of the relevant service must be effected after expiry of said time period. This, too, can be recognized and managed on the basis of a service identification or device identification.

Services to be made available by the device and representing basic function expansions of the electronic device can relate e.g. to the set-up of a secured, insulated area on the device, which is completely disconnected from a remaining unsecured area of the electronic device in terms of hardware and software, in order to save security-relevant data and execute security-relevant processes in said insulated area.

On the other hand, such a basic function expansion of the electronic device can also, as mentioned above, consist in setting up an individualized operation of the device, by the device being equipped within the framework of the registration procedure with an individual identifier that is verifiable by third parties, through which the identity of the device can be detected unequivocally.

For enabling such an individualized operation of the electronic device, the registration unit of the electronic device can for example direct a certificate request to a certification server, said request comprising at least a public key of an asymmetric key pair present on the device or generated by the device. With the certificate request, a request is thus made to the registration server, configured as a certification server, to certify the public key of the electronic device and thereby transfer the trustworthiness of the certification server to the public key.

If the electronic device makes a certified public key available to a communication partner for cryptographically securing messages or for checking a cryptographic signature, the relevant communication partner can verify on the basis of the certificate whether the public key available to it or him actually corresponds with the private key present on the electronic device. Accordingly, upon receipt of the certificate request the certification server creates the certificate for the public key and sends the certificate back to the electronic device as a registration confirmation. Through the certificate the device can then prove its own trustworthiness and identity to arbitrary communication partners, thereby making possible an individualized operation of the device. The certificate comprises a signature which links the service identification or device identification with the generated public key, in a manner verifiable for third parties.

The registration request thus normally comprises a service identification and/or a device identification. The registration confirmation is created for a service identification and/or a device identification which are either received with the registration request or ascertained for the registration request. The registration confirmation can contain a digital signature which is formed via the service identification and/or the device identification and optionally via further data, such as the generated public key.

Preferably, at least the private key of the asymmetric key pair and a possibly received certificate of the public key are stored in a secured area of the device. Said secured area is preferably an insulated, sealed-off hardware and software area that is inaccessible from a possible unsecured area of the device. For the execution of security-critical processes, e.g. the generation of an asymmetric key pair, such an insulated area can have a secure runtime environment with a corresponding interpreter. In particular, the total described registration process can be executed within such a secure runtime environment, so that the registration unit can be an application executable as a process by the runtime environment, operating system application or another software component of the electronic device.

Preferably, a registration unit which creates and sends a certificate request and receives and stores the certificate is realized as a boot loader or as part of a multistage boot loader of the electronic device. In the presence of a secured, insulated area with a secure runtime environment, a registration unit configured as a boot loader can be integrated in particular into a multistage booting procedure of the electronic device or of the secured area and of the secure runtime environment.

Preferably, the individualized operation of the electronic device is carried out upon a first-time booting procedure after delivery of the device to a merchant or user. The enabling of a service within the framework of a (first-time) booting procedure can of course also be provided for arbitrary other services, in particular also for basic function expansions of the device, e.g. the enabling of a secured, insulated area on the electronic device.

BRIEF DESCRIPTION OF THE DRAWINGS

Further features and advantages of the invention will result from the following description of embodiment examples according to the invention as well as further alternative embodiments in connection with the attached drawings, which show.

DETAILED DESCRIPTION OF VARIOUS EMBODIMENTS

The initialization or individualization of an electronic device 100, e.g. of a mobile (telecommunication) terminal, an embedded system, a system-on-a-chip or a portable data carrier, such as a chip card, mobile communication card, secure multimedia card or the like, can be carried out via a cryptographic infrastructure by a public key of an asymmetric key pair present on the electronic device being certified by an authority set up and authorized to do so, for example a certification server 300. Besides the electronic device 100 and the certification server 300, the certification system illustrated in FIGS. 1 and 2 comprises a trustworthy authority 200, e.g. an accordingly set-up computer of a government agency or of another trustworthy authority or the like.

Figure 1:
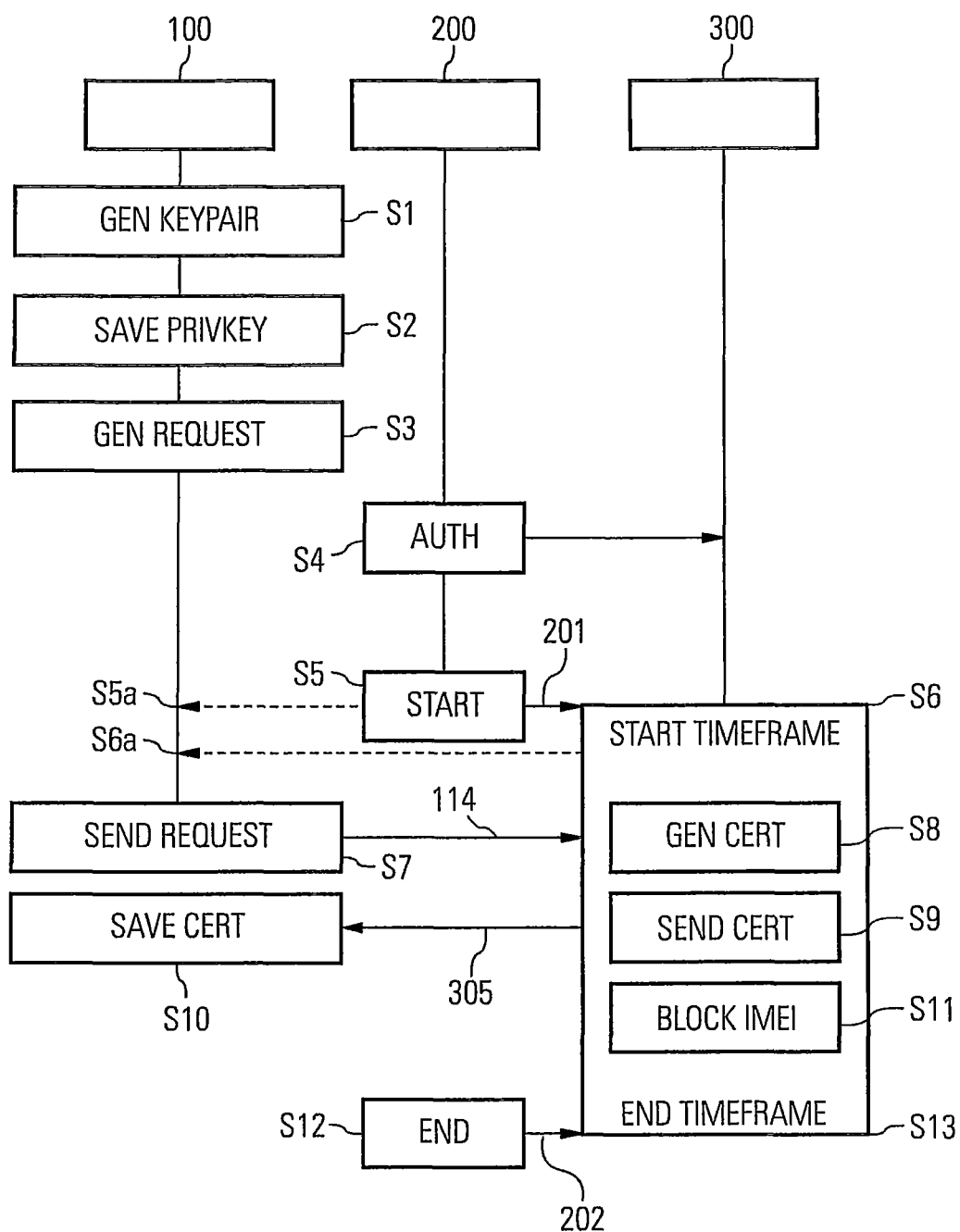
FIG. 1 a flowchart of a method according to the invention.

The flow of the certification process carried out by the certification system is outlined in FIG. 1. First, the electronic device 100 generates in step S1 an asymmetric key pair (GEN KEYPAIR), whereby the private key of the asymmetric key pair is saved in step S2 in a preferably tamper-resistant, secured area 112 of the electronic device 100 (SAVE PRIVKEY). In this manner, the private key is firmly associated with the electronic device 100, so that a message which a communication partner of the electronic device 100 encrypts with the corresponding public key can be decrypted solely by the electronic device 100. Likewise, the electronic device 100 can, by encrypting a message with the private key, generate a cryptographic signature on the basis of which the origin of a sent message can be checked by the recipient by means of the public key of the device 100. Both are only possible with sufficient security, however, when a communication partner of the electronic device can be sure that the present public key actually comes from the relevant electronic device (i.e. that the electronic device possesses the corresponding private key) and has not been planted within the framework of an attempted fraud. In other words, the electronic device must be individualized, i.e. set up for an individualized operation.

The verification of a unique association of the public key with the device 100 can be ensured by the public key being provided by the certification server 300 with an electronic certificate 305, i.e. being associated uniquely with the identity of the electronic device 100. A communication partner of the device 100 to whom or which the public key is available can then check on the basis of the certificate 305 whether the public key actually comes from the electronic device 100.

For this purpose, the device 100 generates in step S3 a certification request 114 which comprises at least the public key to be certified, preferably also a unique identification of the electronic device, e.g. its IMEI number (GEN REQUEST). However, the certification request 114 is accepted and answered with the desired certificate 305 by the registration server 300 solely within a predefined timeframe, so that the device 100 can only carry out the step S7 of sending the certificate request 114 (SEND REQUEST) when the corresponding timeframe on the registration server 300 is open.

The timeframe is set up on the certification server 300 by a trustworthy authority 200. For this purpose, the authority 200 first authenticates itself in step S4 to the certification server 300, e.g. cryptographically or with a password (AUTH), to have its trustworthiness attested by the certification server 300 and thus acquire the authorization to set up the timeframe. The timeframe is then opened on the certification server 300 in step S6 (START TIMEFRAME) by sending of a start signal 201 in step S5 (START). After the certification server 300 receives, after the onset of the timeframe, a certification request 114 sent in step S7, the registration server 300 generates in step S8 a certificate 305 for the received public key (GEN CERT) and sends the certificate 305 back to the electronic device 100 in step S9 (SEND CERT).

The device 100 preferably saves the received certificate 305 in the same secured area in step S10 (SAVE CERT) where the private key was already saved in step S2, and can in the future present its public key to potential communication partners together with the certificate 305 and thereby prove its identity.

In step S11 the unique device identification, e.g. the IMEI number, which the certification server 300 has received in connection with the certificate request 114 is saved in order to recognize a new certification attempt of the same device 100 and to be able to block it as an attempted abuse (BLOCK IMEI), because each further certification request with a different public key can be rated as an attempted fraud. The end of the timeframe can be effected either, as illustrated in FIG. 1, by the trustworthy authority by an explicit end signal 202 in step S12 (END), whereupon the timeframe is closed in step S13 (END TIMEFRAME). Likewise, it is possible that the timeframe is automatically closed immediately after sending of the certificate 305 to the electronic device 100 in step S8, or that the trustworthy authority has already in step S5 transmitted to the registration server 300 within the framework of the start signal 115 the duration of the timeframe, after the expiry of which the timeframe is automatically closed thereby.

With regard to the coordination between the sending of the certificate request 114 in step S6 and the opening/closing of the timeframe in the steps S5 and S12, several variants are possible. On the one hand, the device 100 can already be equipped with corresponding time information (e.g. already saved during the production of the device 100) about the timeframe to be opened on the registration server 300, and therefore needs no explicit notification about the start of the timeframe in step S5. On the other hand, it is also possible that the electronic device 100 is informed about the start of the timeframe and optionally about its duration or end either by the trustworthy authority 200 (in a step S5a) or by the registration server 300 (in a step S6a).

Figure 2:
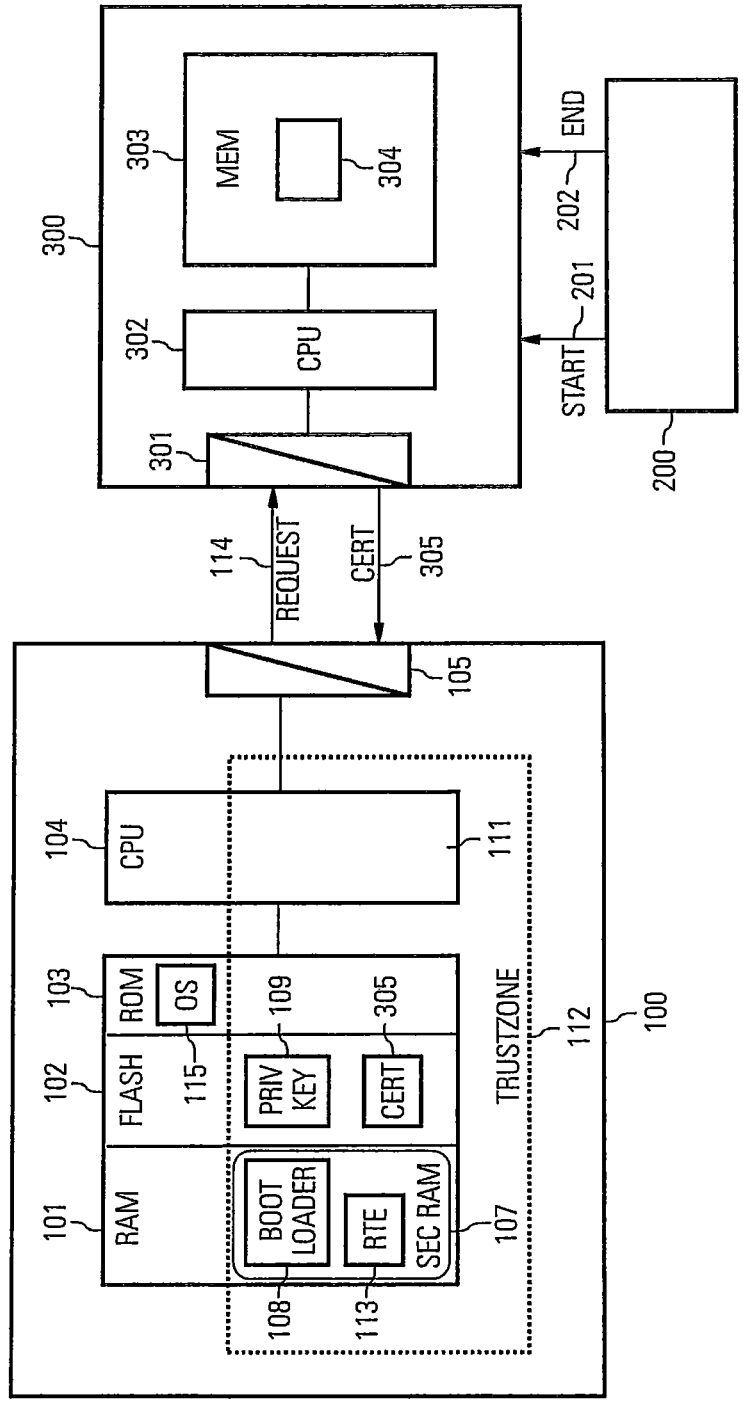
FIG. 2 a registration system according to the invention.

FIG. 2 more precisely describes the architecture of an electronic device 100. The electronic device 100 can be for example an arbitrary mobile terminal, e.g. a mobile radio terminal, a portable data carrier, such as a chip card, mobile communication card or the like, an embedded system or a system-on-a-chip. Such an electronic device 100 comprises in principle all necessary resources and components for the execution of applications and services, in particular a processor CPU 104 as well as a memory device consisting of a RAM working memory 101, a rewritable flash or EEPROM memory 102 and a ROM memory 103 with an operating system 115 (OS). Further, the device 100 comprises a data communication interface 105 for data communication with at least the certification server 300.

Preferably, the electronic device 100 also comprises a secured, insulated area 112 (TRUSTZONE) which forms an area of the hardware and software configuration of the electronic device 100 that is completely sealed off by insulating mechanisms, in particular a secure RAM memory 107 (SEC RAM), in order to save security-critical data and be able to execute security-critical processes therein. In particular, there runs in the secured area 112 a secure runtime environment 113 (RTE) which executes security-critical processes in the secure RAM 107. By a registration unit 108 preferably set up in the secured area 112 there is obtained an initialization and individualization of the electronic device 100 or of the secured, insulated area 112. The insulation of the secured area 112 from the other resources of the electronic device 100 can be obtained via known technologies, e.g. by virtualization in an embedded system or by an independent, secure processor on the same chip as the actual application processor 104.

In the embodiment outlined in FIG. 2, the registration unit 108 of the electronic device 100 is realized as a specialized boot loader 108 (bootstrap loader), which can constitute e.g. an expansion of conventional boot loaders that are used for starting ("booting") an operating system from a "bootable" memory medium or for starting ("booting") an embedded system or an arbitrary other mobile terminal.

In this embodiment, the total certification procedure is carried out by the boot loader 108 within the framework of the booting procedure of the device 100, so that the certification or individualization can be effected at a very early but nevertheless arbitrary time after production of the device 100 or issue to a user. Preferably, the individualization of the device 100 is carried out within the framework of the first boot of the device 100. The registration unit can of course also be configured as an independent registration module stored in a secure area of the flash memory 102, or as an operating system module 115 located in the ROM memory 103 and becoming active at an arbitrary time after the boot of the device 100.

The boot loader 108 generates and saves the private key 109 of the cryptographic key pair in the secured area of the flash memory 102. Likewise, there is saved therein the certificate 305 received from the registration server 300. The boot loader 108 sends the certification request 114 via the data communication interface 105 to the registration server 300 which comprises at least a data communication interface 301, a processor 302, a memory 303 and a certification unit 304 executable by the processor 302. The certification unit 304 accepts the certification request 114, generates the certificate 305 and sends it back to the electronic device 100 or its boot loader 108.

Likewise via the data communication interface 301, the registration server 300 can communicate with the trustworthy authority 200, for example within the framework of an authentication of the trustworthy authority 200 to the registration server 300 and the subsequent set-up of the timeframe on the certification server 300 by start and end signals 201, 202. The trustworthy authority 200 can represent in principle any arbitrary intermediate authority between the manufacturer of the device 100 and the user of the device 100, for example a merchant, a credit institution, a government agency or the like.

Figure 3:
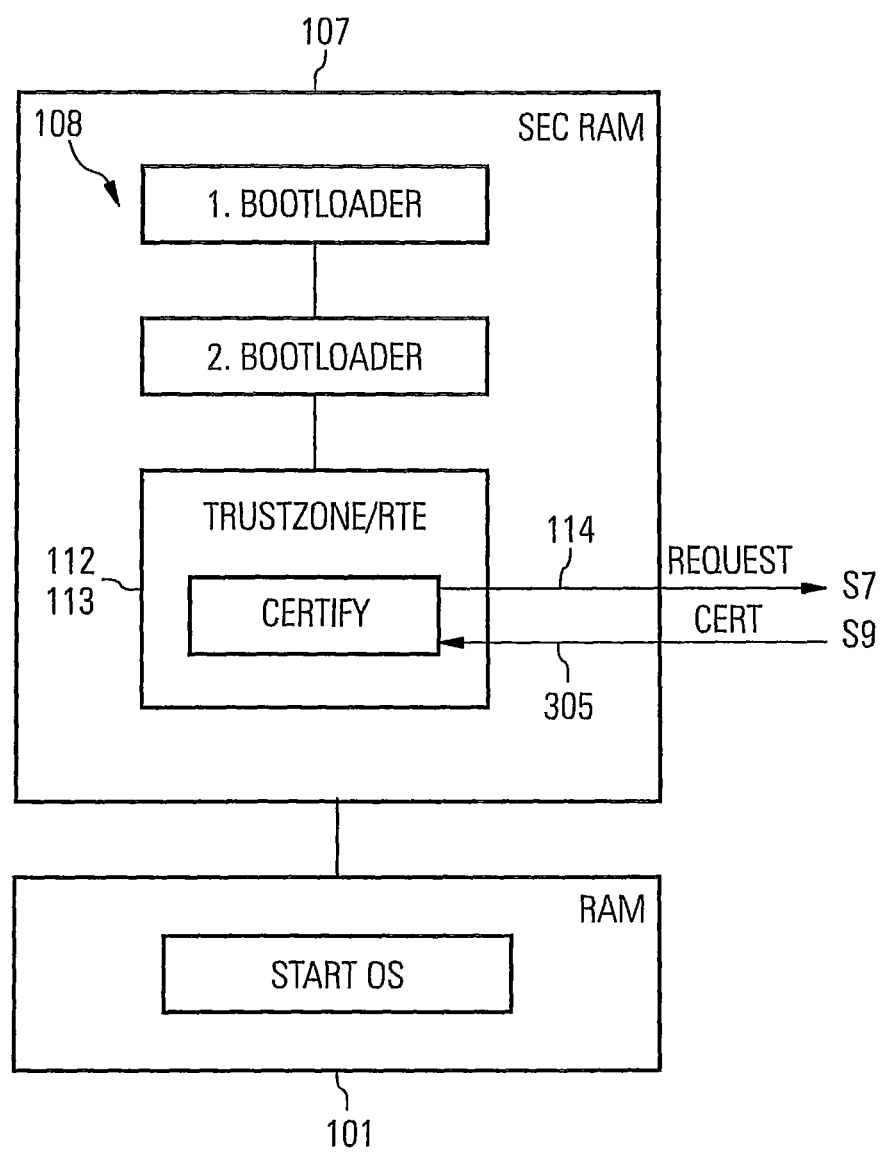
FIG. 3 a special embodiment of a registration unit according to the invention.

FIG. 3 illustrates a booting procedure which is carried out by the boot loader 108 within the secure RAM memory 107. The booting procedure outlined in FIG. 3 is multistage and is carried out by several different boot loaders which preferably in each case boot up different system components, for example the electronic device 100 or its hardware and operating system, the secured area 112 and the secure runtime environment 113. Within the framework of the boot of the secured area 112 or of the secure runtime environment 113, the individualization of the electronic device 100 is carried out by a certification to the certification server 300. The usual multistage booting procedure carried out in connection with a secure runtime environment 113 is thus expanded by a cryptographic initialization or individualization which is carried out by the boot loader 108 optionally upon the first boot of the electronic device 100. Subsequently the operating system 115 is loaded into the unsecured part of the RAM memory 101 in conventional fashion.

Besides the individualization of the device 100 as described in connection with FIGS. 1 to 3, it is in principle possible for arbitrary services to be registered on the device 100 by means of a corresponding registration procedure to a registration server 300 and to be enabled on the device. Such a service to be enabled by means of a registration can be in particular also the use and set-up of the secured, insulated area 112 or of the secure runtime environment 113, or also any other software application or hardware resource available to the user. Thus it is also possible for example that a registration request 114 relates to the enabling of several services and the registration request accordingly contains several service identifications, which can in turn be answered by the registration server 300 individually or jointly. Accordingly, a new registration of these services is then blocked by the registration server 300.

The timeframe can be set up on the registration server 300 by the trustworthy authority 200 in an almost arbitrary way, and is not limited to a booting procedure of the device 100 as described in FIGS. 2 and 3. A timeframe independent of the booting procedure of the device 100 is expedient in particular when the service to be enabled does not involve a basic function expansion, like the cryptographic individualization, but rather the enabling of one or several arbitrary applications which are to be registered to the registration server 300 before an execution on the processor 104 of the device 100 e.g. for billing purposes. In this connection, by accordingly setting up the timeframe there can be provided a registration at an arbitrary time (e.g. also by arrangement with the user) in order to grant the user of the electronic device maximum operating freedom with regard to the utilized services, on the one hand, and to meet the security requirements by setting up a time restriction by means of a timeframe, on the other hand.

The invention claimed is:

1. A method for enabling a service made available by an electronic device, comprising the steps of:
generating a registration request by the device and sending the registration request to a registration server;

generating a registration confirmation by the registration server and sending the registration confirmation to the device; and receiving the registration confirmation by the device and enabling the service by saving the registration confirmation;

setting up a timeframe on the registration server using a trustworthy authority such that the registration server generates and sends a registration confirmation only for a registration request received within the timeframe, and the device sends the registration request to the registration server within the timeframe.

2. The method according to claim 1, wherein the trustworthy authority authenticates itself to the registration server and subsequently sets up the timeframe on the registration server.

3. The method according to claim 1, wherein the trustworthy authority sends to the registration server, for setting up the timeframe, time signals which determine a starting time and an ending time of the timeframe.

4. The method according to claim 1, including using the trustworthy authority to set up the timeframe at an arbitrary starting time after issuance of the device to a user.

5. The method according to claim 1, including generating via the device a registration request which comprises a unique identification of the service to be enabled, and logging the enablement of the service via the registration server on the basis of the unique identification.

6. The method according to claim 1, including enabling a secured area on the device or an individualized operation of the device as a service to be made available by the device.

7. The method according to claim 6, wherein, for enabling the individualized operation, generating as the registration request a certificate request which comprises at least a public key of an asymmetric key pair present on the device or generated by the device, and generating as the registration confirmation a certificate for the public key.

8. The method according to claim 7, including generating via the device a certificate request which comprises a unique device identification, and via the registration server recognizing and blocking a new certificate request of the device on the basis of the unique device identification.

9. The method according to claim 7, wherein on the device there is set up a secured area with a secure runtime environment, and in the secured area saving at least a private key of the asymmetric key pair and the certificate.

10. The method according to claim 6, wherein the enabling of the individualized operation of the device is carried out by a boot loader of the device, which is executed within the framework of a multistage booting procedure of the device.

11. The method according to claim 6, wherein the timeframe is set up such that the enabling of the individualized operation of the device is effected during a first-time booting procedure of the device.

12. An electronic device comprising a processor and a memory for making available a service, a communication interface for data communication with a registration server, and a registration unit which is set up to effect an enabling of the service by generation of a registration request, sending of the registration request to the registration server and saving of a registration confirmation received from the registration server, wherein the registration unit is arranged to send the registration request to the registration server within a timeframe set up on the registration server by a trustworthy authority.

13. The device according to claim 12, wherein the registration unit is arranged to effect an enabling of an individualized operation of the device by generation of a certificate request comprising at least a public key of an asymmetric key pair present on the device, and saving of a certificate received from the registration server.

14. The device according to claim 13, wherein the device is a mobile terminal, an embedded system or a system-on-a-chip in which a secured area with a secure runtime environment is set up, and the registration unit is configured as a boot loader which is set up to effect the enabling of an individualized operation of the device within the framework of a first-time booting procedure of the device and/or of the secured area, said private key of the asymmetric key pair and the certificate of the public key being saved in the secured area.

15. A system comprising an electronic device according to claim 12, a registration server and a trustworthy authority, wherein said device, server and authority are configured to cooperate so that a service made available by the electronic device is enabled according to the method of claim 1.

* * * * *